United States Patent [19]

Weatherspoon

[11] 3,911,154

[45] Oct. 7, 1975

[54] METHOD OF MAKING A NATURAL APPEARING MEAT PRODUCT

[75] Inventor: J. B. Weatherspoon, Fort Wayne, Ind.

[73] Assignee: Peter Eckrich & Sons, Inc., Fort Wayne, Ind.

[22] Filed: June 15, 1973

[21] Appl. No.: 370,404

Related U.S. Application Data

[63] Continuation-in-part of Ser. No. 353,577, April 23, 1973, abandoned.

[52] U.S. Cl. ............... 426/282; 426/92; 426/105; 426/149; 426/284; 426/382; 426/388; 426/513
[51] Int. Cl. ............................................. A22c 18/00
[58] Field of Search .......... 426/104, 105, 129, 149, 426/212, 272, 273, 274, 282, 284, 382, 388, 513, 92, 516, 124, 125, 350

[56] References Cited
UNITED STATES PATENTS

| | | |
|---|---|---|
| 1,381,526 | 6/1921 | Waters .................... 426/149 X |
| 1,813,769 | 7/1931 | Riha .......................... 426/129 |
| 3,503,755 | 3/1970 | McGowan ..................... 426/388 |
| 3,573,062 | 3/1971 | Paynter et al. ................ 426/382 |

*Primary Examiner*—Hyman Lord
*Attorney, Agent, or Firm*—Hofgren, Wegner, Allen, Stellman & McCord

[57] ABSTRACT

A manufactured meat product having the appearance of a natural cut of meat and the method of forming the same. The meat product has a periphery formed of a unitary fat cover having a fat side and a lean side and a center formed of a mixture of meat pieces and a binder. The meat pieces and the binder are bound to each other as well as to the lean side of the fat cover. The product is formed by providing such a fat cover and mixture of meat ingredients, surrounding a stuffing horn with the fat cover with the lean side thereof facing the horn, placing a mold about the horn and the fat cover and delivering the mixture to the mold through the horn. Binding is achieved by heat processing.

6 Claims, 3 Drawing Figures

U.S. Patent  Oct. 7,1975  3,911,154 ary appearing meat product having the complete appearance of a natural cut of meat including a fat border while, in addition, having mouth feel, texture and taste characteristics corresponding to that of the natural cut.

METHOD OF MAKING A NATURAL APPEARING MEAT PRODUCT

CROSS REFERENCE

This application is a continuation-in-part of my co-pending, commonly assigned, application Ser. No. 353,577, entitled "Manufactured Meat Product Having Appearance of Natural Cut", and filed Apr. 23, 1973, now abandoned.

BACKGROUND OF THE INVENTION

This invention relates to manufactured meat products having the appearance of a natural cut of meat such as a steak or the like.

Numerous attempts have been made to provide manufactured meat products that may be used in lieu of a naturally occurring cut of meat. A number of such products have been satisfactory in terms of having a texture of "mouth feel" approximating that of the naturally occurring cut as well as a taste approximating that of the natural cut. A lesser number of such products have been successful to the point of achieving the same appearance as a boned and defatted natural cut. For example, reference may be had to the commonly assigned U.S. patent application of Weiner, Ser. No. 63,651, filed Aug. 13, 1970, now Pat. No. 3,740,235, and which is a continuation of application Ser. No. 756,422, filed Aug. 30, 1968, now abandoned both relating to the manufacture of a beef loaf which may be cooked and sliced to provide a roast beef product.

However, to applicant's knowledge, it has heretofore been impossible to provide a naturally appearing meat product having the complete appearance of a natural cut of meat including a fat border while, in addition, having mouth feel, texture and taste characteristics corresponding to that of the natural cut.

SUMMARY OF THE INVENTION

It is the principal object of the invention to provide a new and improved meat product which has the appearance of a natural cut of meat as well as taste, mouth feel and texture characteristics of the natural cut of meat.

Another object of the invention is to provide a method of making the meat product described in the preceding paragraph.

The exemplary embodiments of the invention achieve the foregoing objects by providing a meat product including a fat cover about at least a portion of its periphery. The fat cover is a unitary piece of meaty material having a fat side and a lean side and the remainder of the product is formed of a bound center comprised of meat pieces intermixed with binder. The meat pieces are bound together and to the lean side of the fat cover.

The meat product may be in either loaf form for subsequent cutting or sliced into individual portion sizes or the like.

The inventive method of the application, in its exemplary embodiment, for fabricating the product described above is as follows. There is provided a fat cover which may be cut off of a natural cut of meat and which includes a lean side and an opposite fatty side. There is also provided a mixture of meaty material including meat pieces and a binder.

The fat cover is placed at least partially about a stuffing horn with the lean side directed inwardly. Thereafter, the stuffing horn and the fat cover are surrounded with a mold having a cross section corresponding to that of the cut of meat to be simulated by the meat product.

The method may also include the step of securing the fat cover to the mold after the latter has been placed about the fat cover and the stuffing horn.

Thereafter, the mixture of meat pieces and binder is directed through the stuffing horn into the mold. Finally, the stuffed mold is further processed to cause the meat pieces to bind together as well as to the lean side of the fat cover. Preferably, although not necessarily, this is achieved by heating the stuffed mold, normally such that the contents of the mold achieve a temperature of 125°F.

The resulting product will have a generally uncooked interior, depending upon the final processing temperature and will retain its integrity upon cutting even when uncooked.

Other conventional processing steps including preservation steps such as freezing may be employed.

Other objects and advantages of the invention will become apparent from the following specification taken in conjunction with the accompanying drawings.

DESCRIPTION OF THE PREFERRED EMBODIMENT

Figure 1:
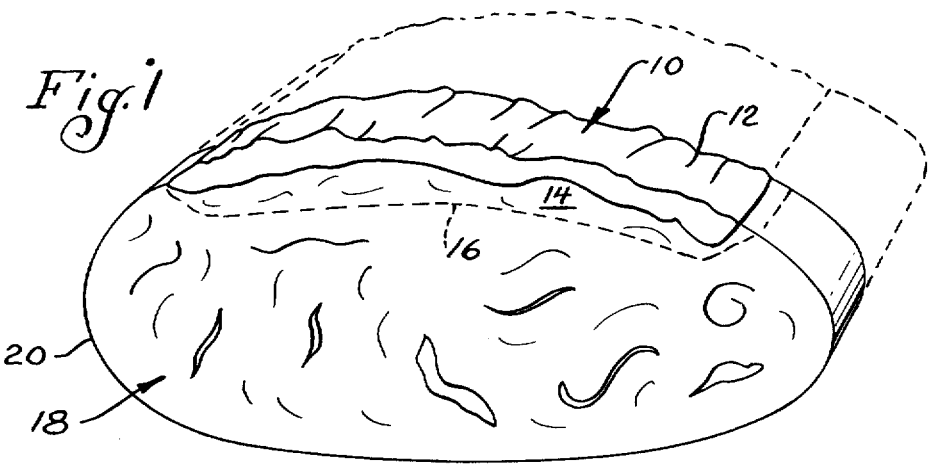
FIG. 1 is a perspective view of a meat product made according to the invention.

An exemplary embodiment of a meat product made according to the invention is illustrated in FIG. 1. The solid line showing is intended to be that of an individual slice which will normally be sized as an individual serving. However, as shown in dotted lines, the same may have a substantial longitudinal extent and be provided to the customer in loaf form for subsequent slicing if desired.

The meat product is formed of two basic components. The first, generally designated 10, is a fat cover and it, in turn, includes a fatty portion 12 and a lean portion 14 (the latter being delimited from the remainder of the product by a dotted line 16). The second portion of the meat product is generally designated 18 and consists of a core formed of a mixture of meat pieces and a binder. The binder binds the meat pieces together and to the lean portion 14 of the fat cover 10 such that the fat cover 10 surrounds at least a portion of the periphery of the core 18.

It will be recognized that while the fat cover 10 is a unitary piece of meaty material, and while pieces making up the core 18 along with the binder are individual pieces of meat, the junction of the individual chunks of meat forming the core as well as the junction of the core with the fat cover 10 are virtually undetectable.

Depending upon processing parameters, and particularly, the process parameters of that portion of the fabrication process resulting in the binding of the pieces together as well as to the lean porton 14 of the fat cover 10, the interior of the core 18 may be cherry red and uncooked throughout, there only being a relatively thin boundary layer 20 on that portion of the exterior of the product not covered by the fat cover 10.

It should be observed that the actual shape of the product can be varied substantially from that shown in FIG. 1 depending upon the natural cut to be simulated. As will become apparent from the following description of the method of forming the same, the variety of shapes that may be used is infinite and, generally, the particular shape to be selected to be dependent upon the naturally occurring cut whose appearance is to be simulated by the meat product.

The method of fabricating the product shown in FIG. 1 will now be described in connection with a beef type product. However, those skilled in the art will immediately recognized that the invention is not so limited. For example, there are any number of varieties of types of animal flesh which may be bound together when in chunk or comminuted form with or without the use of a variety of binders and which are well-known in the art. Similarly, there are a variety of types of naturally occurring cuts having fatty layers on their boundaries and the instant invention is applicable to the fabrication of a meat product simulating any such cuts.

Figure 2:
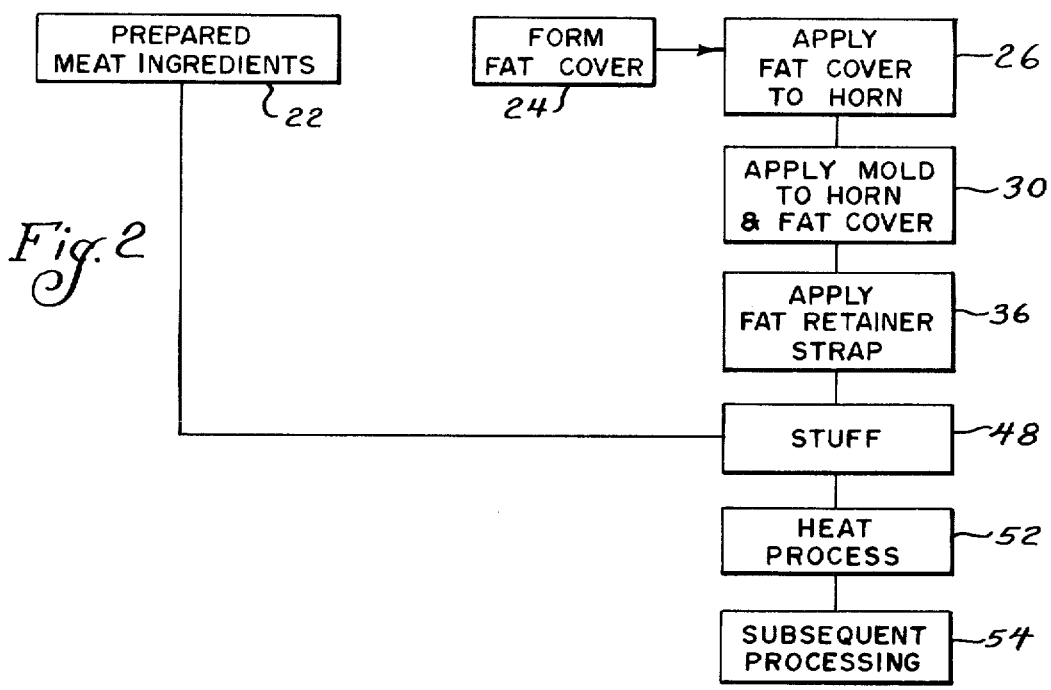
FIG. 2 is a block diagram with the process steps employed in manufacturing the product shown in FIG. 1.

Referring now to FIG. 2, the steps taken in the fabrication of a meat product made according to the invention are illustrated in block form. An initial step in the block designated 22 is the preparation of the meat ingredients which go to make up the core 18 of the product. This can be accomplished in any of a variety of known ways as, for example, in the manner described by Weiner in the above identified application, the details of which are incorporated herein by reference. Alternately, any ground or comminuted meat or meat mixture of discrete meat pieces or particles capable of binding together may be used with or without the use of a binder.

However, to maximize the appeal of the product, particularly when fabricating steak-like products, the following procedure is preferable.

Lean strips of beef are taken from such muscles as, for example, the suprespinatus, deltoid, infraspinatus, spenius, serratus ventralis, bicep femoris, semimembranosus, semitendinosos, adductor, rectus femoris, gracillus and complexus muscles. Such muscles are completely denuded of all surface fat and connective tissue and then cut lengthwise into strips one to two inches in diameter. The cuts are made parallel to the lengthwise direction of the majority of the muscle fibers. The resulting strips will have a length in the range between four and fourteen inches, with the majority being in the range of four to eight inches in length. Ordinarily, the strips will range in weight from 0.10 to 0.75 pounds with an average weight running on the order of 0.25 pounds.

A binder material, when used, is also made. It may be formed of any trim material high in connective tissue but preferably not exceeding 20% fat. Such material is finely ground and preferably comprises 5% of the meat formulation and 3.9% of the total formulation. However, the range of binder which can be used may vary in the range of 0–50% of the meat formulation.

The lean strips are blended with a 5% solution of sodium tripolyphosphate and salt in water. Ordinarily, two minutes of blending will be sufficient. At this point, the binder material, if used, is added and the resulting mixture blended for an additional two minutes. Finally, the entire mixture is mixed, normally for an additional two minutes under a vacuum, preferably at least 28 inches of mercury.

In general, the added moisture of the mixed meat ingredients to form the core 18 will be in the range of 0–10%. The vacuum applied during mixing will be in the range of 0–30 inches of mercury. The total blending time will be in the range of 0–15 minutes. After such preparation, the mixture will be held at a low temperature, preferably between 33°F. and 50°F., until such time as it is stuffed.

An additional ingredient which must be prepared is a fat cover as indicated in the block designated 24. For example, when a strip steak is made, a fat cover having a width generally in the range of six to seven inches will be prepared and will carry an average fat thickness of one-half inch on one surface and a lean thickness of one-half inch on the other surface. Preferably, although not necessarily, a fat cover having such a thickness with the relationship of fat to lean specified above with the width varying depending upon the product to be made will be employed in all products made according to the invention.

The fat cover is weighed and the lean surface thereof is treated with 0.15 to 0.50% of salt on the lean surface and then passed through a mechanical tenderizer which acts primarily on the lean surface. The salt assists in binding the fat cover 10 to the core 18 when the two are united during a stuffing operation.

Figure 3:
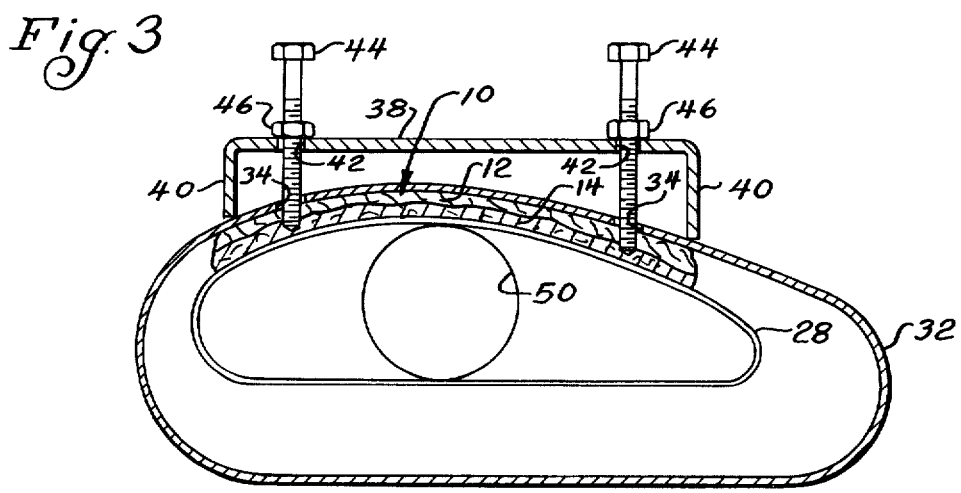
FIG. 3 is a cross section of a stuffing horn, fat cover and surrounding mold as oriented during the fabrication of the product illustrated in FIG. 1.

The next step in the process is illustrated in the block designated 26 and consists of the application of the fat cover to a stuffing horn. With reference to FIG. 3, a stuffing horn 28 having an elongated cross section receives the fat cover 10 on the upper surface thereof. The particular shape of the stuffing horn 28 is dictated by the product to be made. That shown in FIG. 3 is employed in the fabrication of a meat product which will appear as a so-called "strip steak".

The next step in the process is illustrated in FIG. 2 in block 30 and consists of the application of a loaf mold 32 (FIG. 3) to the stuffing horn with the fat cover 10 already being applied thereto. The loaf mold 32 will be conventional in all respects with the exception that its cross section will be shaped in accordance with the desired periphery of the product to be formed and, according to the preferred embodiment, will have a series of apertures 34 extending along one side thereof as seen in FIG. 3,.

Returning to FIG. 2, the next step in the process is indicated in block 36 and consists of the step of applying a retaining means to the resulting assemblage to secure the fat cover 10 to the mold 32. According to one embodiment of the invention, a retaining strap 38 having downturned legs 40, or a series of such straps, are located on the upper surface of the mold 32 after the same has been applied to the stuffing horn and fat cover. The hight of the strap 38 includes tapped openings 42 which receive bolts 44 and associated jam nuts 46. The apertures 42 in the strap 38 are aligned with the apertures 34 in the loaf mold 32 such that the bolts may pass freely through the apertures 34 to enter into at least the fatty portion 12 of the fat cover 10. This insures that the fat cover 10 cannot move relative to the loaf mold during the subsequent stuffing process.

The next step in the process is shown in FIG. 2 in a block 48 and consists of a stuffing step. In this step, the meat strips and binder, if any, resulting from the step illustrated in the block 22 are introduced into the circular end 50 of the stuffing horn 28 and directed into the closed end of the loaf mold 32. As such stuffing takes place, the mold 32 will be gradually forced off of the end of the stuffing horn 28 and in view of the connection of the fat cover 10 to the mold 32, it will follow the latter.

When the mold is completely stuffed, it will be closed with a conventional spring loaded lid.

After the mold 32 has been stuffed, the next step of the process, as indicated in FIG. 2, is illustrated in block 52 and is the step of binding the various ingredients together. That is, the strips in the core are bound to each other and to the lean side 14 of the fat cover 10 during this step. This can be accomplished in a variety of ways, but according to the present invention, heat processing is preferred. It should also be recognized that there is no requirement that heat processing immediately follow the stuffing. For example, the stuffed molds could be held at a low temperature to preclude bacterial growth for substantial periods prior to heat processing.

The heat processing can be conducted in the same general manner described by Weiner in the above-identified application. However, the internal temperature of the stuffed mold at the conclusion of the processing step can deviate substantially from the limits disclosed by Weiner as will be seen and, in general, it is preferable to heat the contents to a temperature slightly higher than the maximum contemplated by Weiner as, for example, 125°F.

It should also be understood that the stuffed containers need not be placed in a heated atmosphere until the desired internal temperature is reached. An examination of elementary heat transfer principles will show that there is a temperatue gradient from the exterior of the meat product within the mold to the center thereof. Thus, if it is desired that the center achieve a temperature of, say, 125°F., heat processing may be terminated when the center thereof is at a considerably less temperature as, for example, 115°F. Since the outer layers of the product will normally be above 125°F. at this time, heat will continue to be transferred from the outermost layers to the center to raise the temperature of the center to the desired temperature without further application of external heat.

Preferably, the heat processing is accomplished in a heated zone such as an oven at a temperature up to 200°F. The atmosphere in the oven may either be dry or moist, the latter enhancing the rate of heat transfer. Temperatures in excess of 200°F. are not desired in that they have a tendency to cause the outer layer 20 to become charred and unsightly.

After heat processing, subsequent processing, shown in block 54, is performed. Subsequent processing will normally include the removal of the product from the mold, the chilling of the same to a temperature whereat bacterial growth is discouraged but not sufficiently low as to preclude slicing. Typically, such a temperature will be on the order of 25°F. After the product is sliced it may be packaged and frozen to a lower temperature as, for example 0°F. or below. However, if the product is to be sold in loaf form for subsequent slicing upon removal of the same from the mold, it may be immediately frozen to 0°F. or below and packaged.

The invention also includes the use of additional ingredients as, or example, preferential oxidizers such as sodium citrate, sodium erythorbate, sodium ascorbate or glucono delta lactone for the purpose of enhancing color stability after slicing and packaging. Such ingredients are added during the step illustrated in the block 22 in FIG. 2 in their usual amounts.

It should also be observed that various parameters may be varied. For example, the stuffing pressure may be varied substantially from virtually zero pounds per square inch up through 65 pounds per square inch with a preferred value on the order of 25 pounds per square inch. The oven temperatures during heat processing may vary from 100°F. up to 200°F. with a preferred temperature of 145°F. Temperatures below the range are not preferred because the rate of heat transfer is too low to be economical. Temperatures above the range are undesirable because of their adverse affect on the appearance of the product. The internal temperature to which the product is heated may vary from 40°F. up to 165°F. with a preferred value of 125°F.

While not necessary to form a suitable product, the use of a special stuffing horn (differing from conventional stuffing horns in respects other than shape) is preferred in forming the most desirable product. In particular, such a stuffing horn will typically have an extremely long length with the slope of the side extending outwardly from the opening 50 to the end thereof being no more than 0.08 inches per foot. A stuffing horn so fabricated allows the strips forming the core of the product to tend to orient themselves in a longitudinal fashion along the axis of the horn and thus the axis of the mold 32. Since such strips have been cut to have a length running generally parallel to the direction of orientation of the muscle fiber, it will be appreciated that after the mold has been stuffed, the muscle fibers will generally run transverse to the cross section of the product. This orientation, of course, is that found in natural cuts. Accordingly, the use of such a stuffing horn provides a product having the texture, mouth feel and appearance of the core material closely simulating that of a natural meat cut.

Where such orientation is not necessary, the special stuffing horn may be dispensed with. In addition, the use of long strips in forming the ingredients of the core is not necessary. Chunks or comminuted meat may be used in lieu thereof.

It should also be observed that the meat ingredients need not necessarily be taken from the specific muscles identified previously. Again, the specific origin of the meat ingredients is solely dependent upon the degree of accuracy in matching the natural cut desired.

It will be appreciated that the invention has a number of advantages in addition to those of providing a meat product having the taste, texture, mouth feel and appearance of a natural cut of meat. For example, it is made to have a uniform shape from one loaf to the next with the result that cooking of the product may be more easily controlled by the user. That is, a number of the variables found in natural cuts such as size, thickness of the fat cover, etc., which influence cooking time and temperature, are eliminated allowing the same cooking process parameters to be repetitively employed. This can be a very real advantage of a commercial establishment dealing with the sale of the cooked meat product. In addition, cuts of meat of lower cost than the natural cut to be simulated by the product may be employed in fabricating the product if desired. This allows the product to be sold at a lower cost than a naturally occurring cut which it simulates.

I claim:

1. A method of making a natural appearing meat product comprising the steps of:
   a. providing a fat over having a lean side and an opposite fatty side;
   b. providing a meat mixture capable of being stuffed through a stuffing horn;
   c. placing the fat cover at least partially about a stuffing horn with said lean side inwardly;
   d. surrounding the stuffing horn and the fat cover with a mold;
   e. securing said fat cover to said mold;
   f. directing said mixture through the stuffing horn into said mold while precluding substantial relative movement between said mold and said fat cover so that the mold is filled by said fat cover and said mixture; and
   g. further processing the stuffed mold to cause said mixture to bind together and to said lean side.

2. The method of claim 1 wherein step (g) includes the step of heating the stuffed mold.

3. A method of making a natural appearing meat product comprising the steps of:
   a. providing a fat cover having a lean side and an opposite fatty side;
   b. providing a mixture including meat pieces and binder capable of being stuffed through a stuffing horn;
   c. placing a mold about a stuffing horn with said fat cover interposed between the mold and the stuffing horn with said lean side facing the stuffing horn;
   d. directing said mixture through said stuffing horn into said mold while precluding substantial relative movement between said mold and said fat cover so that the mold is filled by said fat cover and said mixture; and
   e. further processing the stuffed mold.

4. The method of claim 3 wherein step (e) includes the step of heating the stuffed mold to bind the contents together, and the step of freezing the resulting product.

5. A method of making a natural appearing meat product comprising the steps of:
   a. providing a fat cover having a lean side and an opposite fatty side;
   b. providing a meat mixture capable of being stuffed through a stuffing horn;
   c. placing a mold about a stuffing horn with said fat cover interposed between the mold and the stuffing horn with said lean side facing the stuffing horn;
   d. directing said mixture through said stuffing horn into said mold while precluding substantial relative movement between said mold and said fat cover so that the mold is filled by said fat cover and said mixture; and
   e. further processing the stuffed mold.

6. The method of claim 5 wherein step (c) is followed by, and step (d) is preceded by the step of securing the fat cover for movement with the mold relative to the stuffing horn.

* * * * *